(12) United States Patent
Larikka

(10) Patent No.: US 6,433,307 B1
(45) Date of Patent: Aug. 13, 2002

(54) DEVICE FOR WELDING CYLINDRICAL WORKPIECES

(75) Inventor: Leo Larikka, Vantaa (FI)

(73) Assignee: Efes Tex AG, Lugano (CH)

( * ) Notice: Subject to any disclaimer, the term of this patent is extended or adjusted under 35 U.S.C. 154(b) by 0 days.

(21) Appl. No.: 09/674,561

(22) PCT Filed: Apr. 22, 1999

(86) PCT No.: PCT/IB99/00717

§ 371 (c)(1),
(2), (4) Date: Oct. 26, 2000

(87) PCT Pub. No.: WO99/55486

PCT Pub. Date: Nov. 4, 1999

(30) Foreign Application Priority Data

Apr. 28, 1998 (FI) .................................................. 954/98

(51) Int. Cl.⁷ ................................................. B23K 9/02
(52) U.S. Cl. .................................. 219/125.11; 219/60 A
(58) Field of Search .......................... 219/125.11, 59.1, 219/60 A, 61, 76.14, 158, 74

(56) References Cited

U.S. PATENT DOCUMENTS 5,310,982 A    5/1994 Jusionis

FOREIGN PATENT DOCUMENTS

FR        1294275       10/1962
WO      WO 92/20488    11/1992

*Primary Examiner*—Clifford C. Shaw
(74) *Attorney, Agent, or Firm*—Townsend and Townsend and Crew LLP; Guy W. Chambers

(57) ABSTRACT

The invention relates to a device for welding cylinder-shaped and rotatable elements together. An axially displaceable electrode shaft (1) is provided in a rotatably seated pipe shaft (8). The pipe shaft (8) can be rotated with respect to the electrode shaft (1), and a connecting head (4) is provided on one end of the pipe shaft (8), which is equipped with gripper elements (5) for an interchangeable protective chamber (3). Gripper and positioning elements for a fastening cassette (31) provided for the parts (A, B) to be welded together, which is also interchangeable, are arranged in the protective chamber (3). The electrode shaft (1) extends through the connecting head (4) into the protective chamber (3).

9 Claims, 2 Drawing Sheets

DEVICE FOR WELDING CYLINDRICAL WORKPIECES

FIELD OF THE INVENTION

The invention relates to a device for welding cylinder-shaped elements and rotatable bodies together, comprising an electrode shaft, positioning and fastening means for the elements to be welded together and a pipe shaft surrounding the electrode shaft.

BACKGROUND OF THE INVENTION

When welding cylinder-shaped workpieces together, the connecting surfaces are of two shapes as a rule. With cylinder-shaped workpieces which are cut transversely in respect to the cylinder axis, the ends meet squarely and the joint surface constitutes a circle. This type of welded connection is a rotatable welded connection, which can be easily mechanized. If the cylinders meet at a defined angle, a geometric figure is formed at the joint surface, whose shape is a function of the diameters of the cylinders and of the angle, at which the center lines of the cylinders meet.

If there are several of these branched cylinders, i.e. pipe junctions, on a base cylinder, which in addition also lie close together, the customary welding from the outside is difficult. Such structures can be, for example, housings of multiway valves, filter bodies, pipe junctions and corresponding structural elements. When welding pipe junctions, and in particular T-junctions, the small height of the neck of the base cylinder and the size of customary welding nozzles present problems.

The above mentioned problems can be eliminated by approaching the welding position from the inside of the junction cylinder. Then the small height of the neck or a second junction in the vicinity on the outside no longer constitute obstacles. The welding nozzle is at the height of the seam, while the workpiece (or the welding nozzle) turns around its own axis.

A second area of problems is constituted by long workpieces, whose rotation cannot be simply provided. A typical example of this is if distribution chambers are to be made from a pipe, wherein several pipe junctions are attached to a long pipe.

The coaxial alignment of the cylinders in respect to each other is of extreme importance. To assure the quality of the weld seam, it is necessary to protect the workpieces to be welded together from the oxygen in the air by enclosing the workpieces in a chamber filled with a protective gas. In order to minimize the amount of the protective gas and the fill time, the chamber must be as small as possible. However, the small size of the chamber in turn causes problems when inserting the workpiece in the holder located in the chamber. Because of the small size of the chamber it is not possible to simultaneously work with one's hands in the chamber and to look into the chamber.

OBJECT AND SUMMARY OF THE INVENTION

The object of the invention is based on providing a device by means of which the above described problems can be removed and the consumption of protective gas in particular can be reduced, even if the size of the workpieces to be welded together varies.

The invention relates to a device for welding cylinder-shaped and rotatable elements together. An axially displaceable electrode shaft is provided in a rotatably seated pipe shaft. The pipe shaft can be rotated with respect to the electrode shaft, and a connecting head is provided on one end of the pipe shaft, which is equipped with gripper elements for an interchangeable protective chamber. Gripper and positioning elements for a fastening cassette provided for the parts to be welded together, which is also interchangeable, are arranged in the protective chamber. The electrode shaft extends through the connecting head into the protective chamber.

An exemplary embodiment of the invention will be explained in greater detail in what follows, making reference to the attached drawings.

DETAILED DESCRIPTION OF THE PREFERRED EMBODIMENT

Figure 1:
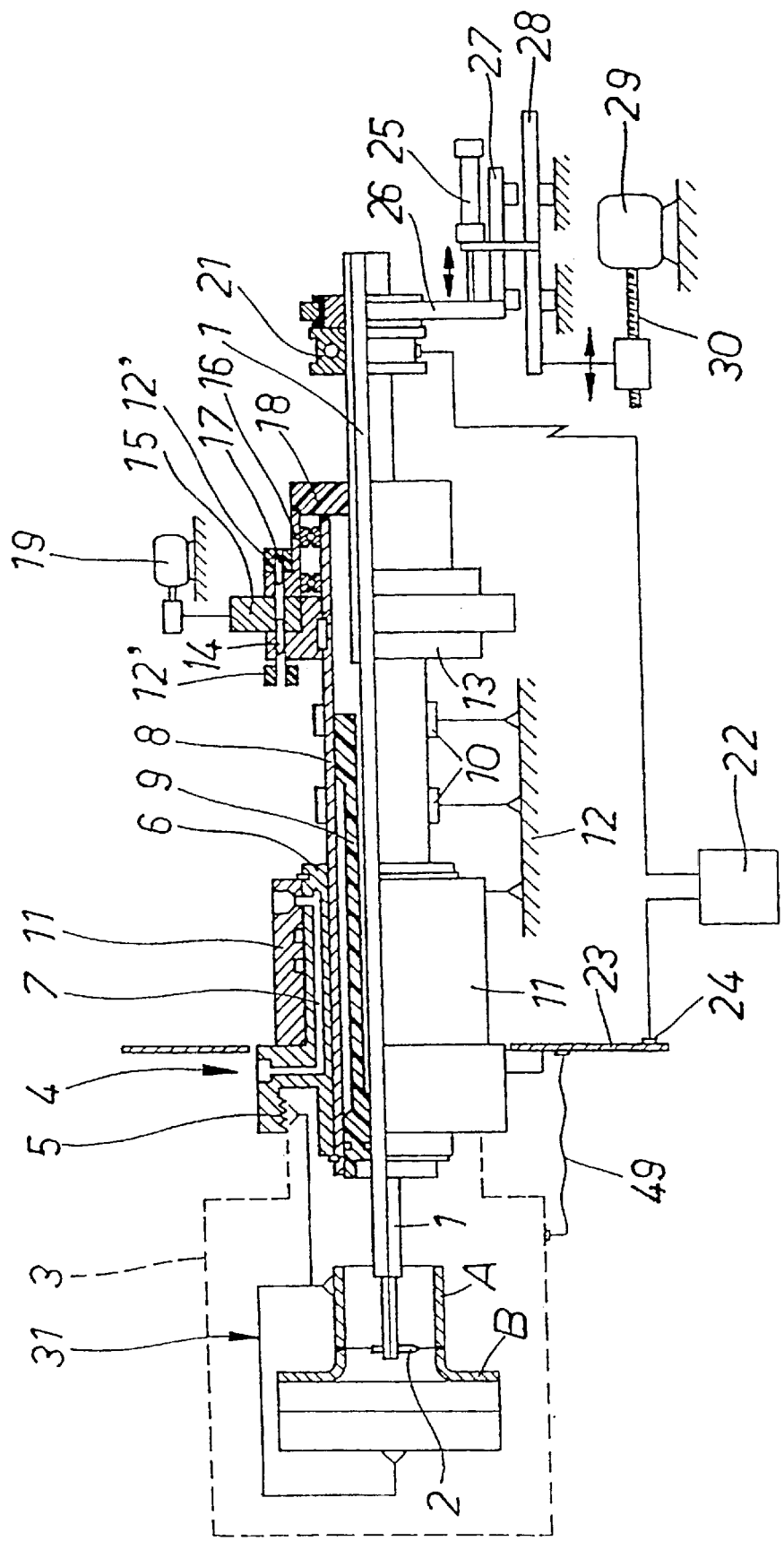
FIG. 1 represents a device in accordance with the invention viewed from the side, wherein the portion above the centerline is shown in longitudinal section.

Part of the device represented in FIG. 1 is a pipe shaft 8, which is seated rotatably in respect to the frame 12 in bearings 10. The support shaft 1 of the welding electrode 2 is a long shaft, which extends through the pipe shaft 8 concentrically in respect to the pipe shaft 8. An insulation material pipe 9, which is used as the bearing between these elements, is provided between the electrode shaft 1 and the pipe shaft 8. Thus, the electrode shaft 1 and the pipe shaft 8 are rotatable in respect to each other, and the electrode shaft 1 can moreover be moved in the axial direction.

The pipe shaft 8 is surrounded by a frame element 6, which turns along with it, in which protective gas channels 7 are formed and which terminates at a widening forming a connecting head 4. The frame 6 extends over only a portion of the length of the pipe shaft 8. Next to the connecting head 4, the sleeve 6 is enclosed by a non-rotatable frame 11, which is fastened on the frame 12 to prevent the rotation of the latter. This frame sleeve 11 has the required connectors for the protective gas, the cooling gas and the compressed air required for the closing cylinder of the protective chamber 3. Rotatable connectors for providing the required gas connections to the channels 7 provided in the sleeve 6 and which end at the connecting head 4 are located between the frames 6 and 11. Only one channel 7 is represented in FIG. 1, but there are of course several of these, which are suitably distributed on the circumference of the frame 11 and of the connecting head 4.

A threaded bushing gripper element 5 with an interior thread is provided on the connecting head 4, to which the protective chamber 3 can be connected by means of a threaded connector. The positioning and fastening means in the form of a fastening cassette 31 for the parts A, B to be welded together are fastened on the threaded bushing 5 of the connecting head 4. This is only schematically indicated in FIG. 1. An exemplary embodiment is shown more detailed in FIG. 2, wherein the bottom section 32 of the protective chamber 3 is provided with a projecting neck 38, which is surrounded by a threaded sleeve 37, by means of which the chamber 3 can be fastened on the threaded bushing 5. The upper section 33 of the chamber 3 can be closed by means of the rod 35 of the piston of a cylinder 34. The upper section 33 is guided on vertical guides 48, whose upper ends are fastened on the cylinder 34. By means of seals 36 it is assured that the closed chamber 3 is tight.

The fastening cassette 31 intended for the workpieces to be welded together is pushed into the chamber 3, guided by guides 39 located on the bottom of the chamber. The guides 39 extend parallel with the axial direction of the electrode support shaft 1, wherein the cassette slides in the axial direction of the electrode shaft into its intended position. Grooves 40 for the guides 39 are formed at the edges of the bottom of the fastening cassette 31. The workpieces to be welded together are correctly positioned in respect to the welding electrode 2. A stop 41, which can be fixed in place or axially adjustable, is provided at the end of the guides 39 for the axial positioning taking place in the axial direction. A spring-loaded pressure element 50 is arranged on the ceiling of the chamber which, when the upper section of the chamber has been lowered, meets the rear edge of the cassette 31, its upper and rear side, keeping the cassette 31 fixed in its place.

Figure 2:
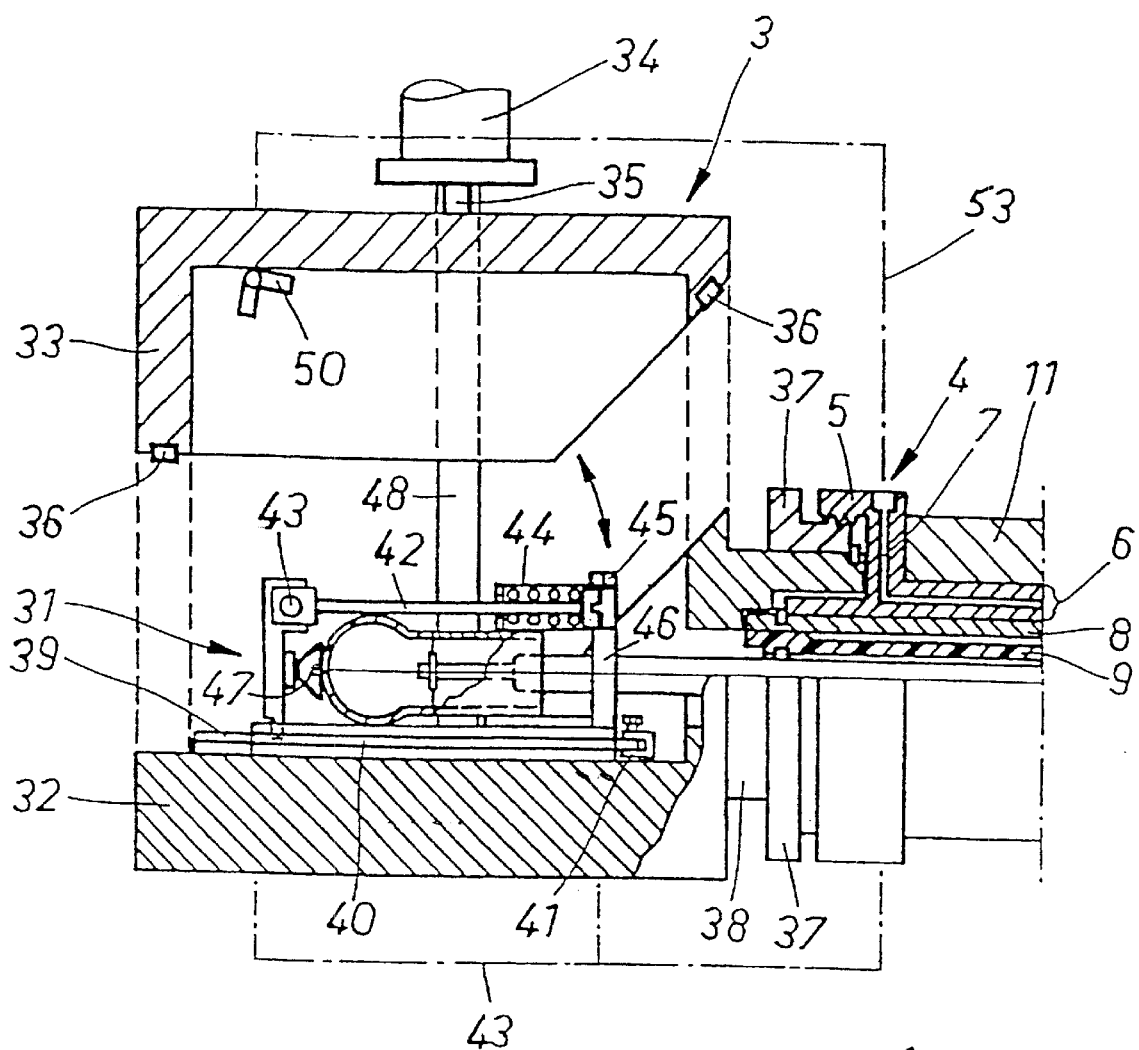
FIG. 2 shows in greater detail an example of the protective chamber as provided in a device in accordance with FIG. 1, and of the fastening cassette housed in the protective chamber and intended for the workpieces to be welded together, and FIG. 3 schematically represents a combination of the protective chamber and the fastening cassette corresponding to FIG. 2, viewed from the front, i.e. in the axial direction of the device.
Figure 3:
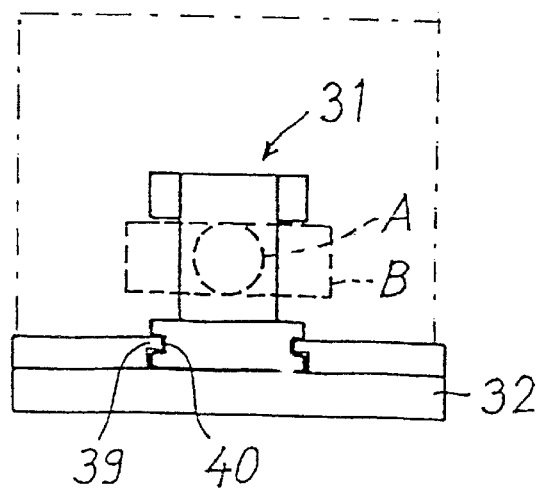

In the case represented, arms 42, which can be pivoted around a hinge shaft 43 with an axle visible in FIG. 2 as a point, are a part of the fastening cassette 31, which arms have a spring-loaded arresting element 45 at their ends, which grasps the cassette behind the upper edge of its front 46. Sleeves 44 project from the arresting element 45, which sleeves contain springs which have been pressed between the bottom of the sleeve 44 and the ends of the arms 42. If the arresting element 45 in FIG. 2 is pulled to the right against the force of the springs, the arms 42 can be pivoted upward around the hinge shaft 43.

The workpieces to be welded are placed into the cassette 31 while it is outside of the chamber 3. There are typically two cassettes 31 per chamber 3 so that, while a first cassette 31 is in the chamber 3, the other cassette 31 can be filled with parts to be welded. A regulating screw 47 determines the position of the parts, and the downward pivoted arms 42 arrest the parts to be welded in place. Since the protective chamber 3, as well as the fastening cassette 31, can be interchanged, their dimensions can be reduced to a minimum for the respective workpiece size, which reduces the protective gas consumption to a minimum.

The drive mechanism 19 drives a driving wheel 15, which can be arrested with the control spindles 14 and 17 in such a way that it selectively rotates either a driving wheel 13 acting on the pipe shaft 8, or a drive wheel 16 rotatably seated on the pipe shaft 8, which grips the electrode shaft 1 via an insulation material flange 18. If one of the driving wheels 13 and 16 is activated, the other remains unrotatably arrested on the frame 12'. In the illustrated case, the control spindle 14 switches the rotary drive to the pipe shaft 8 and arrests the electrode shaft 1 so it cannot be rotated. In this case the connecting head 4 and the chamber 3 with the fastening cassette fastened on it rotate together with the pipe shaft 8. The parts A, B to be welded together rotate in respect to the welding electrode 2. Since the gas connections have been attached to the rotatable connecting head 4, they can be connected by means of hoses 53 to the chamber 3, as represented in FIG. 2.

If a geometric shape formed by two cylinders is welded, the welding electrode 2 must follow the curved shape of the connecting place. This is achieved by means of a threaded shaft 30, driven by a motor 29, which displaces a horizontal guide 28, which in turn displaces the aggregation constituted by a cylinder 25 and an arm 26. The arm 26 adheres to the electrode shaft 1, whose long rapid movement can be produced by means of the cylinder 25, which moves the arm 26 and a horizontal guide 27 in respect to the horizontal guide 28. The purpose of the rapid movement is to move the electrode 2 into the working position and away from it, while the precision movement of following the curved shape of the connecting place taking place during welding is produced by means of the motor 29. The precision displacement motor 29 is program-controlled to perform its displacement movement as a function of the rotating movement of the pipe shaft 8.

The welding current is brought to the welding spot from a current source 22, which is connected to a slide ring 21 fastened on the shaft 1 by means of an electric cable. The ground cable is connected to a slide ring 24, which is located on a flange 23. An electrical connection 49 exists from the flange 23 to the protective chamber 3 and on to the fastening cassette 31 fastened therein. The insulating bearing sleeve 9 and the insulating flange 18 assure that the voltage applied to the shaft 1 is not transmitted to other parts of the device.

The invention is not limited to the above exemplary embodiment. In particular, the construction and shaping of the protective chamber 3 and of the positioning and fastening cassette 31 connected therewith can vary in many ways. It is essential that both are fastened by means of the same threaded bushing gripper elements 5 to the connecting head 4, wherein they are together interchangeable with such chambers and positioning and fastening means which are matched in shape and size to the respective pipe elements which are to be welded together.

What is claimed is:

1. A device for welding cylinder-shaped and rotatable elements together comprising:

an electrode shaft which conveys the welding current to the welding electrode, a positioning and fastening cassette for the elements to be welded together, a pipe shaft surrounding the electrode shaft, which is rotatably seated with respect to the electrode shaft, a connecting head fastened on said pipe shaft, which is provided with gripper elements for an interchangeable protective chamber, said positioning and fastening cassette being arranged in connection with the protective chamber in such a way that it is fastened at a connecting head by means of the same gripper elements as the protective chamber, means for rotating the pipe shaft together with the connecting head and the protective chamber, means for arresting the electrode shaft, so that it cannot be rotated while the pipe shaft is rotated, and means for axially moving the electrode shaft with respect to the pipe shaft.

2. The device in accordance with claim 1, wherein said positioning and fastening shaft is located in the protective chamber.

3. The device in accordance with claim 2, further comprising a second positioning and fastening cassette, and gripping and positioning members for the second positioning and fastening cassette which are provided in the protective chamber.

4. The device in accordance with claim 3, wherein
guides are a part of the gripping element and fastening cassette by means of which the fastening cassette can be pushed in the axial direction of the electrode shaft into position in the protective chamber.

5. The device in accordance with claim 1, further comprising
means by which the electrode shaft can be rotated, while other means switch the pipe shaft so it cannot be rotated.

6. The device in accordance with claim 1, further comprising
a threaded bushing at the connecting head, to which a threaded sleeve projecting from the protective chamber can be connected by means of a threaded connector, and that the threaded bushing is united with a sleeve element, which surrounds the pipe shaft and rotates together with it, in which protective gas channels are provided, which are connected with the protective chamber by means of hoses arranged between the connecting head and the protective chamber.

7. The device in accordance with claim 1, further comprising
a motor equipped with a threaded shaft to allow axial movement of the electrode shaft.

8. The device in accordance with claim 1, wherein
the axial movement of the electrode shaft is controlled in such a way that it takes place simultaneously with the rotating movement of the electrode shaft and of the pipe shaft and as a function of that movement.

9. The device in accordance with claim 1, wherein
the electrode shaft is seated in the pipe shaft by means of an insulating material pipe provided between them.

* * * * *

UNITED STATES PATENT AND TRADEMARK OFFICE
CERTIFICATE OF CORRECTION

PATENT NO.     : 6,433,307 B1
DATED          : August 13, 2002
INVENTOR(S)    : Larikka, Leo It is certified that error appears in the above-identified patent and that said Letters Patent is hereby corrected as shown below:

<u>Title page,</u>
Item [30], Foreign Application Priority Data, the Country Code of the April 28, 1998 Priority Application No. 954/98 should be -- (CH) -- and not "(FI)".

Signed and Sealed this

Twenty-fifth Day of February, 2003

JAMES E. ROGAN
*Director of the United States Patent and Trademark Office*